Feb. 12, 1929.

F. NOVOTNEY 1,702,017

AUTOMOBILE SIGNAL

Filed Dec. 24, 1927     2 Sheets-Sheet 1

Inventor
Fredrick Novotney
By Herbert E. Smith
Attorney

Feb. 12, 1929. 1,702,017
F. NOVOTNEY
AUTOMOBILE SIGNAL
Filed Dec. 24, 1927 2 Sheets-Sheet 2
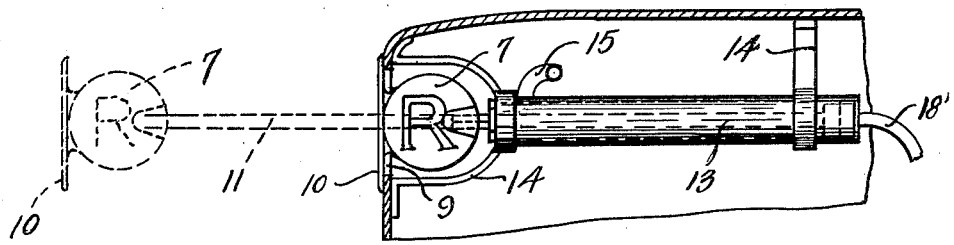
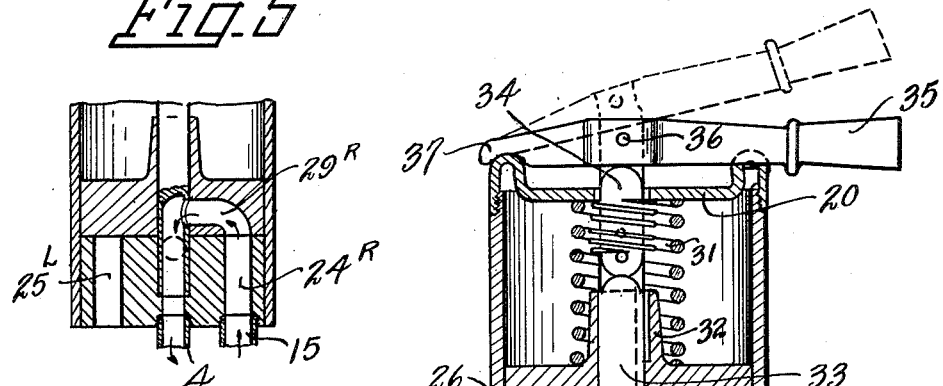
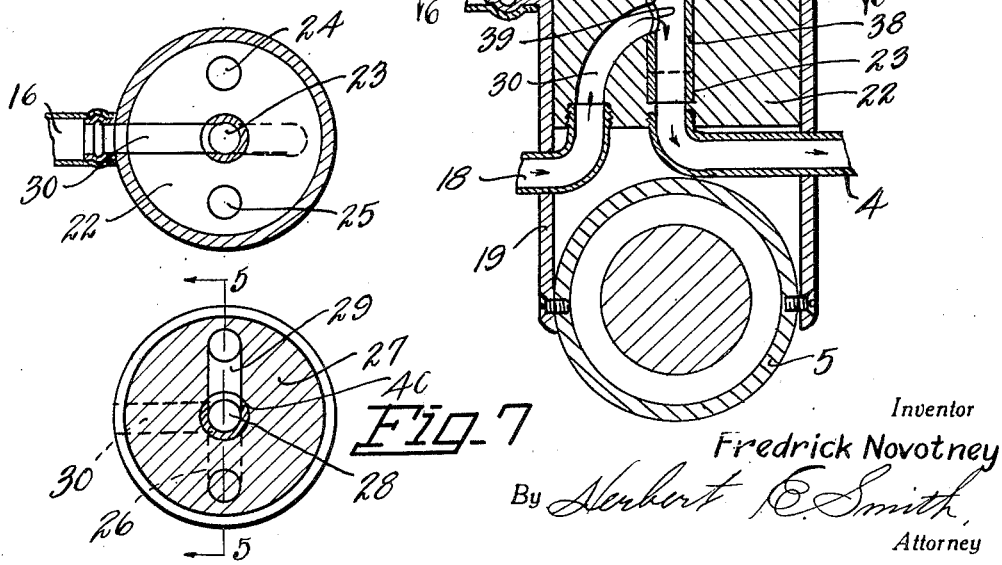
Inventor
Fredrick Novotney
By Herbert E. Smith,
Attorney Patented Feb. 12, 1929.

1,702,017

UNITED STATES PATENT OFFICE.

FREDRICK NOVOTNEY, OF CRESTON, WASHINGTON.

AUTOMOBILE SIGNAL.

Application filed December 24, 1927. Serial No. 242,455.

My present invention relates to improvements in automobile signals primarily designed for the purpose of notifying motorists and others of the purpose of an automobile driver when he is about to make a turn or to stop his vehicle.

The invention involves the use of a plurality of signals or semaphores, herein shown as three in number and designated as Stop, Right and Left, and these semaphores or signals are adapted to be projected laterally from a portion of the vehicle, as the hood or cowl. Means are provided whereby suction created by the operation of the motor or engine is utilized for the purpose of projecting the selected sign, and means are utilized to employ the same power for retracting the sign after it has been displayed.

A control valve is utilized and this valve may be turned to a selected position to control the energy of the suction for the purpose of projecting and retracting the desired or selected signal.

The invention consists in certain novel combinations and arrangements of parts as will hereinafter be more fully set forth and claimed.

In the accompanying drawings, I have illustrated one complete example of the physical embodiment of my invention wherein the parts are combined and arranged according to the best mode I have so far devised for the practical application of the principles of my invention.

Fig. 3 is a transverse vertical sectional view of a portion of the hood of an automobile showing one of the signals projected and indicated in dotted lines;

Fig. 4 is a sectional detail view of the control mechanism including the rotary valve and its reciprocal stem, and showing also connections to the cylinders forming part of the signal operating mechanism;

Fig. 5 is a sectional detail view on line 5—5 of Fig. 7;

Fig. 6 is a transverse sectional detail view on line 6—6 of Fig. 4; and

Fig. 7 is a transverse sectional view on line 7—7 of Fig. 4.

Figure 1:
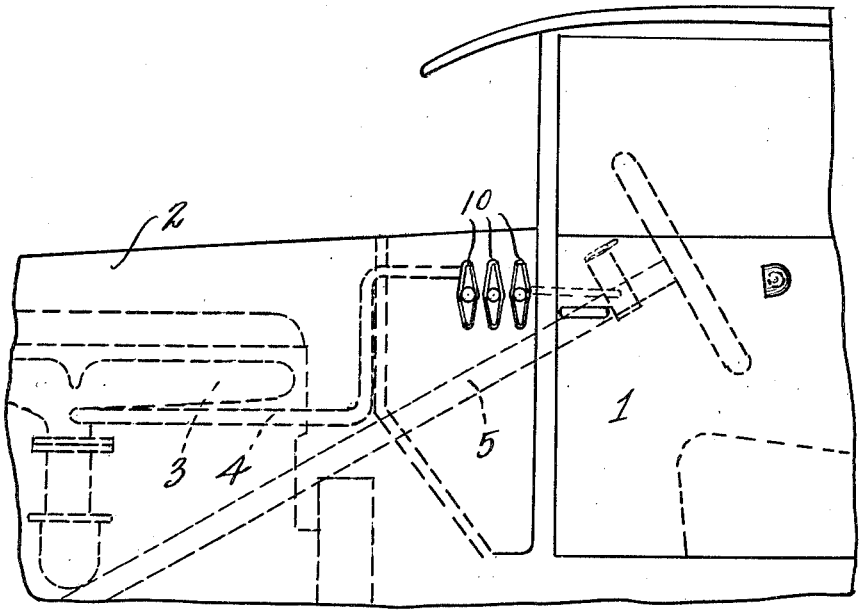
Figure 1 is a view in elevation showing so much of an automobile as is necessary to illustrate the installation therewith of the signal device of my invention.

In order that the general arrangement and relation of parts may readily be understood, I have shown in Fig. 1 a portion of an automobile as 1 having the usual hood 2 with the intake manifold 3 shown in section and a suction pipe 4 also shown in section is connected with the intake manifold and this pipe is the main suction pipe providing energy which is developed by the operation of the engine or motor. The post 5 which is indicated in dotted lines in Fig. 1 and which supports the steering shaft, is utilized to support the control mechanism of my invention.

In carrying out my invention as shown in the drawings, I have illustrated three semaphores as 6, 7 and 8 which are in the form of metal disks and provided with Stop, Right and Left signals, respectively. These semaphores or disks are designed to be projected laterally, as from the left side of the hood of an automobile, or they may be located at other desirable parts of the automobile. Each of the semaphores when in retracted position is enclosed within the hood of the automobile and when projected the semaphore pass through a vertical slot 9 in the hood or cowl and this slot is closed by a cover plate 10 on the semaphore when the latter is in retracted position.

Each semaphore is carried at the free or outer end of a piston rod 11 which is provided with a piston head 12 that is reciprocable in a cylinder 13. Thus there are three of these cylinders arranged in parallelism and extending transversely of the automobile within the hood or cowl and supported as by brackets 14.

These cylinders are connected by suction pipes 15, 16 and 17 to the valve control mechanism and at the opposite ends of the cylinders a suction pipe 18 is connected by its respective branches 18'. When suction is present in one of the pipes 15, 16 or 17, the pressure back of the piston 12 projects the semaphore or signal, and when suction is present in one of the branch pipes 18' and pipe 18, the pressure against the opposite side of the piston 12 moves the piston and with it its rod and semaphore and the latter is retracted.

This reciprocal movement of the pistons and semaphores is accomplished through the utilization of a control valve device which controls the suction to and from the opposite ends of the cylinders as follows.

A cylindrical casing or valve casing 19 is attached to the steering post 5 and in position where it is readily accessible for the driver of the car. This cylinder or casing is provided with a flanged head 20 and this flanged head is provided with three notches as 21 in its edges corresponding to the cylinders and semaphores of the signal device.

Within the casing is a fixed block 22 having a central opening 23 and this block is provided with a port 24 for communication with the right turn cylinder, a port 25 for communication with the left turn cylinder, and a port 26 for communication with the stop cylinder. Within the valve casing and above the block is provided a rotary valve 27 which has an open center 28 corresponding to the open center 23 of the block, and this rotary valve is designed to rotate with the adjoining faces of the valve and block 22 in frictional contact. The rotary valve is provided with a passage 29 extending radially from its center bore and this passage 29 is designed to register with either of the ports 24 or 25 in the block 22. A passage 30 is provided in the block 22 with which passage the suction pipe 18 is connected and this passage communicates with the center passage 23 of the block 22.

The rotary valve is held to its seat in contact with the block 22 by means of a spring 31 which is coiled about a boss 32 on the valve and interposed between the valve and the head 20 of the valve casing. The valve is fashioned with a stem 33 which is of sufficient length to project into the block 22 and a link 34 which is pivoted to the stem projects through an opening in the casing head 20. The valve lever 35 which extends transversely of the valve casing is pivoted to this link at 36 and the free end 37 of the lever is used as a fulcrum and has a bearing upon the flanged edge of the head 20.

The inner end of the valve stem is formed as a sleeve 38 and this sleeve portion fits in the open center 23 of the block 22. This sleeve or tubular end of the stem is provided with oppositely arranged ports 39 and 40 which as shown in Fig. 4, are designed to register with passages 29 and 30. The port 39 is shown as registering with the passage 30 and it will be apparent that suction from the motor or engine is drawing air from the pipe 18 through the passage 30, the tubular end of the stem 38 and thence into the vacuum pipe 4 as indicated by dotted lines. Thus if one of the semaphores is in projected position and the valve is turned to the position indicated in Fig. 4, the suction through the pipe 18 and branches 18' permits pressure at the opposite side of the piston 12 to move the piston and thus retract the projected sign or semaphore from the projected dotted position in Fig. 3.

Figure 2:
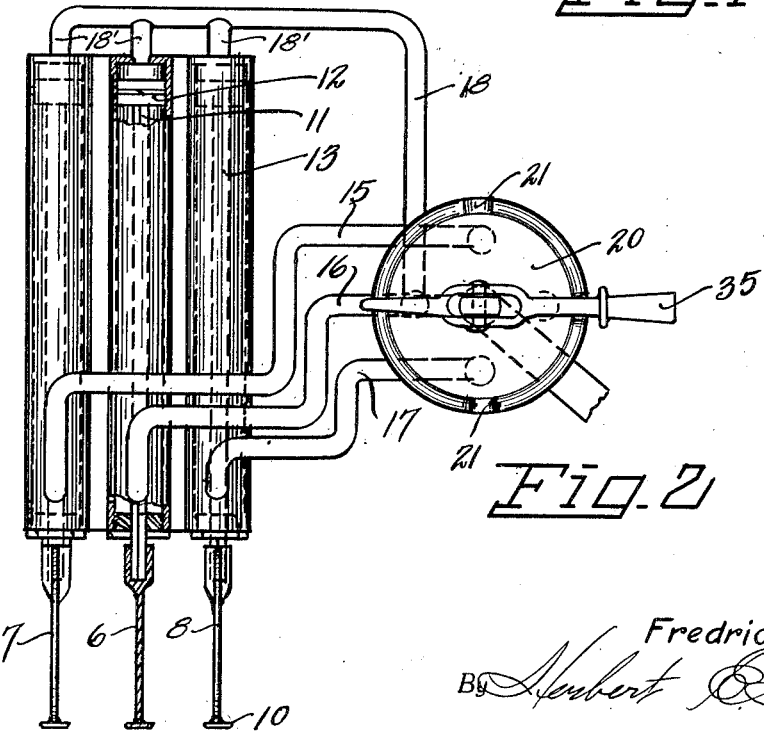
Fig. 2 is a plan view with parts in section showing the equipment.

The lever 35 may be manipulated as indicated by dotted lines in Fig. 4. Normally the lever 35 rests in one of the notches 21 and in Figs. 2 and 4 the valve is in position to retract the stop signal or semaphore. If it is to be projected, the lever is lifted to dotted position in Fig. 4 so that the port 39 will register with the passage 26, and then the suction is through pipe 16 of the middle cylinder, and pressure at the opposite side of the piston will project the semaphore 6 to displayed position. When the lever is returned to the notch as indicated by full lines in Fig. 4, this projected semaphore is retracted as described. The right and left hand semaphore are operated by manipulating the lever 35, in Fig. 2 to operate the right semaphore 7 the lever is turned up to vertical position, and to operate the left semaphore 8 the lever is turned down to the left in Fig. 2.

From the above description taken in connection with my drawings, it will be apparent that I have provided a signal mechanism which may readily be controlled to project or retract the semaphore for the purpose described, and these parts may with facility be controlled by the driver of the automobile without distracting his attention from the operation of the car.

Having thus fully described my invention, what I claim as new and desire to secure by Letters Patent is—

The combination with a plurality of parallel cylinders having a single pipe connecting their inner ends, and a pipe connected near the outer end of each cylinder, a piston in each cylinder, a piston rod and a semaphore on the end of each rod, of a valve casing and a suction pipe connected thereto, said single pipe connected to said suction pipe, the other cylinder pipes connected to the casing, and a rotary valve within the casing for controlling suction between the main suction pipe and the cylinder pipes.

In testimony whereof I affix my signature.

FREDRICK NOVOTNEY.